Jan. 8, 1924.  1,479,937

F. A. STEVENS

SPECTACLE TEMPLE

Original Filed June 22, 1921

Inventor:-
Frederick A. Stevens.
By David Rines
Attorney:-

Patented Jan. 8, 1924.

1,479,937

UNITED STATES PATENT OFFICE.

FREDERICK A. STEVENS, OF PROVIDENCE, RHODE ISLAND, ASSIGNOR TO STEVENS AND COMPANY, INC., OF PROVIDENCE, RHODE ISLAND, A CORPORATION OF RHODE ISLAND.

SPECTACLE TEMPLE.

Original application filed June 22, 1921, Serial No. 479,479. Divided and this application filed July 1, 1922. Serial No. 572,154.

*To all whom it may concern:*

Be it known that I, FREDERICK ARTHUR STEVENS, a citizen of the United States, and a resident of Providence, in the county of Providence and State of Rhode Island, have invented a new and useful Improvement in Spectacle Temples, of which the following is a specification.

This application is a division of a co-pending application, Serial No. 479,479, filed June 22, 1921.

The present invention relates to spectacle temples of the combined-metal-and-non-metallic type, and it has for its object to provide a new and improved temple of the said type that shall be more efficient, more durable, neater and of simpler construction than any heretofore proposed.

With the above end in view, the invention consists of the improved spectacle temple hereinafter described, illustrated in the accompanying drawings and defined in the appended claims.

Figure 1:
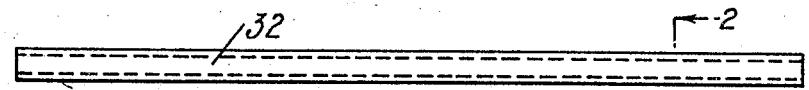
Figure 2:
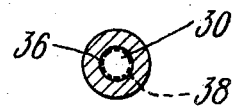
Figure 3:
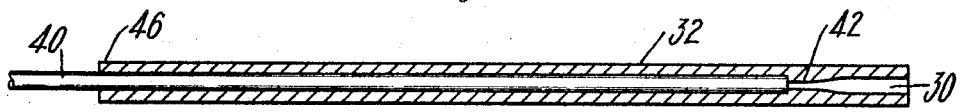
Figure 4:
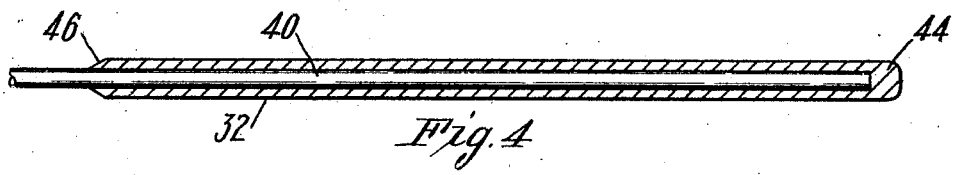
Figure 5:
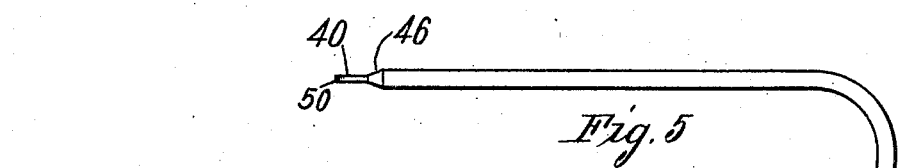
Figure 6:
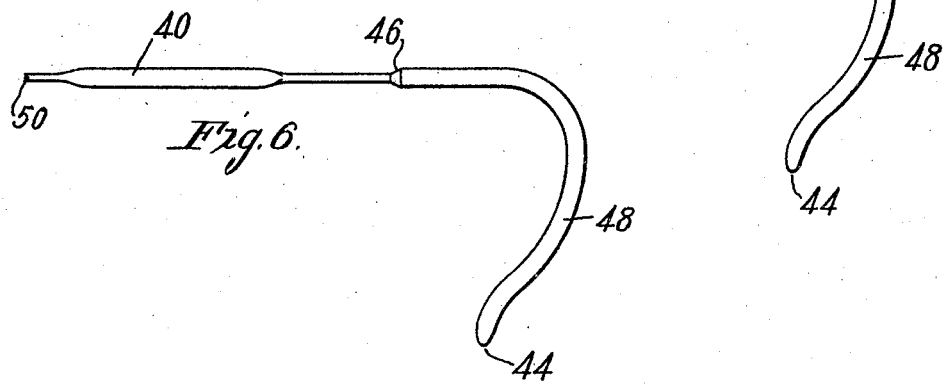

In the drawings, illustrating a preferred embodiment of the present invention, Fig. 1 is a view of a non-metallic tube adapted to be combined with a metal rod to form a temple; Fig. 2 is a section taken upon the line 2—2 of Fig. 1; Figs. 3 and 4 show steps illustrating a preferred method of manufacturing the temple of the present invention; and Figs. 5 and 6 show two types of temples constructed according to the present invention, Fig. 5 showing the metal rod completely enclosed within the tube, except for the hinge member or end piece, and Fig. 6 showing the metal rod partly in and partly without the tube.

The undesirable features of spectacles constituted of plain metal rods being well understood, many attempts have heretofore been made to produce a more desirable and efficient article. Some of these efforts have been restricted to the use of metal parts only. In other cases, the temples have been made of both metal and non-metallic parts. As an instance of this latter type of temple, a metal rod has been enclosed within a non-metallic tube of such material as rubber; but after a very short period of use behind the ear, the perspiration and heat of the wearer begin to soften the rubber, causing it to wear away in an unsightly manner, rendering is mushy, and dirt-collecting, and in other respects becoming very annoying and uncomfortable. Rubber tubes on temples have therefore never proved to be successful in practice. The use of celluloid, zylonite, and similar substances suggested itself some years ago, but prior to the present invention no satisfactory temple composed of such substance combined with metal had been invented, though many kinds of temples had been proposed and tried. Temples the forward portions of which were of metal and the rear portions of zylonite have been in limited use, for example, but they are seldom seen any more. For one thing, there is constant breakage at the point of junction between the metal and the zylonite; and for another thing, the unreinforced zylonite can not hold its shape and therefore becomes very soon a source of annoyance. It has accordingly been proposed to bend a zylonite sheet around a metal temple rod and to secure the zylonite to the metal by such expendients as pressure, heat, biting projecting parts and the like; but heat perspiration soon cause the zylonite sheet to open out again and the usefulness of the temple becomes impaired. Prior to the present invention, therefore, no really successful temple of the combined metal-and-non-metallic type had been produced.

According to the present invention, the metal rod is mounted in the bore of a seamless tube that is constituted of a non-metallic material having the property that, when exposed to air, it will shrink in a direction away from the air. Zylonite, celluloid, etc., are such materials. No matter how fully cured these materials may be, they always shrink further in the manner described when exposed to the atmosphere. In order to avoid circumlocution of language, therefore, all such substances will hereinafter be referred to in the specification and the claims under the single term "zylonite," though it will be understood that the term is here intended to include not zylonite alone, but all substances having the above-described property. The zylonite tube is prepared with a bore of sufficient diameter to admit the metal rod, but preferably not too freely. Once the rod is in place in the bore of the tube, the air is therefore shut off from the walls of the bore, and so all further shrinking of the tube is in a direction away from the air-exposed exterior of the tube and is against the rod. The more that the semi-liquid ingredients of the zylonite volatilize into the air, the more tightly does the material of the tube shrink or collapse in against the rod until, after a comparatively short period of time, the tube hugs the rod so tightly that it becomes impossible to separate them except by cutting or paring away the material of the tube. A much better spectacle temple is thus produced than any heretofore proposed. It may be bent into any desired shape and it will hold that shape. The parts are so firmly united that they can not easily be separated, so that the temple is very durable. And the cost of manufacture is greatly reduced.

The temple may be easily and quickly produced by simply inserting a metal rod into a zylonite tube of the proper dimensions, and simply permitting the zylonite tube to shrink into tight engagement with the rod. This will produce a very satisfactory temple, but some additional holding means, such as spurs or other biting parts, are desirable if the temple is to be used before the zylonite is allowed to set. This simple construction can be greatly improved, and the process of setting hastened, by softening the bore of the tube with acetone, alcohol, or other solvent prior to introducing the rod into the bore. The diameter of the bore is thereby made uniform and the zylonite will thus initially engage the rod as closely as possible, thereby more effectively shutting out the air from the walls of the bore and hastening by so much the tight shrinking process. The softened zylonite also acts as a lubricant to permit easy entry of the rod.

The preferred temple of the present invention is therefore preferably made by first squirting or otherwise injecting acetone or some other softening element into the bore 30 of the zylonite tube 32. This will have the effect of softening the inner wall or bore of the tube. The softened material expands beyond its original dimensions, thereby decreasing the diameter of the bore from the full-line circle 36 to the dotted-line circle 38, indicated in Fig. 2. A metal rod 40 of somewhat greater diameter than the diameter of the circle 38 is then inserted into the bore and forced endwise thereinto, driving the softened material in advance of it, as will be understood from the showing at 42 of Fig. 3. The mass of the softened material accumulates until, when the rod 40 has been forced into the tube a predetermined distance, the softened material 42 will have entirely closed the bore, which condition is illustrated at 44, Fig. 4. The softened zylonite plugged at 44 between the end of the tube and the rod will harden into a solid mass. The inner or forward end 46 of the tube may be compressed against the metal into the form shown. The air is thus further excluded from the bore by the plug 44 and at the compressed portion 46. The resulting structure may then be bent into the customary shape, illustrated at 48, completing the temple. The forward end of the rod 40 is shown integrally provided with an end piece or hinge member 50, whereby the temple may be hinged to a spectacle frame.

The method described in the present application is not claimed herein, as the temple of the present invention may be made in other ways than that illustrated and described herein. The illustrative method forms the subject matter of a separate divisional application, Serial No. 497,641, filed September 1, 1921.

Modifications may be made by persons skilled in the art, and such modifications are intended to be embraced within the spirit and scope of the present invention, as defined in the appended claims.

What is claimed as new is:

1. A spectacle temple comprising a seamless zylonite tube and a reinforcing rod in the tube, the rear portion of the tube with the reinforcing rod therein being bent to the shape of a temple, and the temple being adapted to be hinged at the forward end.

2. A spectacle temple comprising a seamless zylonite tube and a reinforcing rod in the tube, an end of the tube being plugged to conceal the corresponding end of the rod, the portion of the tube adjacent to the plugged end, with the reinforcing rod therein, being bent to the shape of a temple, and the temple being adapted to be hinged at the other end.

3. A spectacle temple comprising a seamless zylonite tube and a reinforcing rod in the tube and having its forward portion extending forward beyond the tube, the rear portion of the tube with the reinforcing rod therein being bent to the shape of a temple, and the forward, extending portion of the rod being provided with a hinge member for hinging the temple.

4. A spectacle temple comprising a reinforcing rod the forward end of which is provided with a hinge member, and a zylonite member within which the reinforcing rod is completely enclosed except for the hinge member, the rear portion of the zylonite member with the reinforcing rod therein being bent to the shape of a temple, and the temple being adapted to be hinged by means of the hinge member.

5. A spectacle temple comprising a seamless zylonite tube and a reinforcing rod the forward end of which is integrally provided with a hinge member, the reinforcing rod, except the hinge member, being completely enclosed within the tube, the rear portion of the tube with the reinforcing rod therein being bent to the shape of a temple, and the temple being adapted to be hinged by means of the hinge member.

6. A spectacle temple having a forward portion and a rear portion and comprising a seamless zylonite tube and a reinforcing rod in the tube, the rear portion of the temple being bent to the shape of a temple, and the temple being adapted to be hinged at the free end of the forward portion.

In testimony whereof, I have hereunto subscribed my name this 27th day of June, 1922.

FREDERICK A. STEVENS.